(12) United States Patent
Cohn et al.

(10) Patent No.: US 8,976,708 B1
(45) Date of Patent: Mar. 10, 2015

(54) PARAMETERIZED DEVICE MODELS FOR OPENFLOW

(71) Applicant: Google Inc., Mountain View, CA (US)

(72) Inventors: Daniel Todd Cohn, Oakland, CA (US); Edward Crabbe, San Francisco, CA (US); Navindra Yadav, Cupertino, CA (US)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/776,026

(22) Filed: Feb. 25, 2013

(51) Int. Cl.
H04L 12/24 (2006.01)

(52) U.S. Cl.
CPC .................................. H04L 41/0813 (2013.01)
USPC .......................................................... 370/254

(58) Field of Classification Search
USPC ............... 370/351–398, 422–430; 700/29–31
See application file for complete search history.

(56) References Cited

U.S. PATENT DOCUMENTS

| | | | |
|---|---|---|---|
| 2007/0274230 A1* | 11/2007 | Werber et al. ................. | 370/254 |
| 2012/0033666 A1* | 2/2012 | Holness et al. ............... | 370/389 |
| 2013/0163427 A1* | 6/2013 | Beliveau et al. .............. | 370/235 |
| 2013/0163475 A1 | 6/2013 | Beliveau et al. | |
| 2014/0075498 A1* | 3/2014 | Porras et al. ....................... | 726/1 |
| 2014/0129687 A1* | 5/2014 | Halpern ......................... | 709/221 |

OTHER PUBLICATIONS

"OpenFlow Primitive Set"; Cohn et al.; Jul. 2011 (retreived from the Internet on Dec. 15, 2014).*

Andreas Wundsam et al: NOSIX: A Portable Switch Interface for the Network Operating System, TR-12-013, Oct. 1, 2012, XP055120641, (URL:https://www.icsi.berkeley.edu/pubs/techreports/ICSI_TR-12-013.pdf) Section 3, Figure 2.

Curt Beckmann: "Clearing up the Fog around the FAWG Flexibility meets Diversity ONF BLOG News & Even Working Group Membership About", Oct. 18, 2012, XP055121190, (URL:https:www.opennetworking.org/?p=373&option=com_wordpress &Itemid=471) the whole document.

Dan Cohn et al "OF-Futures Primitive Set—Google Docs", Google Docs (http://goo.gl/6qwbg), Jul. 1, 2011, XP055120456, Retrieved from the Internet: (URL:https://docs.google.com/document/d/1v_10MCPBZ1RBWYnleN-2v9Pix0HUCtXPCJK0hwKaRRA/edit?pli=1)p. 3-p. 8, p. 36-p. 37.

(Continued)

*Primary Examiner* — Benjamin H Elliott, IV
(74) *Attorney, Agent, or Firm* — Edward A. Gordon; Foley & Lardner LLP

(57) ABSTRACT

A controller in a communication network may be responsible for generating a device model that defines intended forwarding behavior of a network. The device model may be generated using a target-independent universal language of network primitives. The controller may assign a first set of parameters to the device model to generate a first parameterized device model. The controller may assign a second set of parameters to the device model to generate a second parameterized device model. The controller may send the first parameterized device model or the second parameterized device model to a target device. The target device may statically or dynamically translate the received parameterized device model(s) to implementation. The controller is not required to generate a new device model for each modification made to the network: the controller may parameterized a generic device model to reflect the modifications.

18 Claims, 8 Drawing Sheets

(56) References Cited

OTHER PUBLICATIONS

David Meyer: "OpenFlow, Software Defined 1-38 Networking, and Where its All Going", World Telecommunications Congress 2012, Mar. 4, 2012, XP055120459, Retrieved from the Internet: URL:http://www.ieice.orgrwtc2012/Slides/Workshops/WS2-3/WS2-3 2.pdf.

International Search Report and Written Opinion on Application No. PCT/US2014/018421 dated Jun. 11, 2014.

Teemu Rinta-Aho et al: "The Click2NetFPGA Toolchain", Proceedings of the 2012 USENIX Conference on Annual Technical Conference, Jun. 13, 2012, XP05512144, Boston, MA (URL:https:www.usenix.org/system/files/conference/atc12-final16.pdf) Section 2.4-Section 2.5, Section 3, Figure 1.

* cited by examiner

US 8,976,708 B1

PARAMETERIZED DEVICE MODELS FOR OPENFLOW

BACKGROUND

In communication networks, such as telephone networks and data networks, including the Internet, information may be sent along a path from a source device to a destination device. The source device and the destination device may be, for example personal computers, servers such as email servers, web servers, or file servers, or other electronic devices capable of sending and/or receiving information via the network.

The information may pass through one or more forwarding devices, such as routers or other electronic devices having the ability to forward the information to another device. The intermediate devices may receive the information and use functions, algorithms, data structures, and rules to determine where and how to forward the information so that the information moves towards its intended destination. These functions, algorithms, data structures, and rules form the "forwarding plane" of the network. The functions, algorithms, data structures, and rules of the forwarding plane may be implemented and/or enforced by one or more forwarding devices in the network.

For example, a forwarding device may receive a packet on an inbound interface, look up the destination address of the packet, and apply a rule which causes the forwarding device to look up the destination address in a particular routing table. The routing table may provide a list of "next destinations" which represent a device to which the packet should be sent. The next destination for a particular packet might be, for example, the final destination device or another intermediate forwarding device. The next destination may be identified by an address stored in the routing table. The next destinations stored in the routing table may be indexed by a final destination of the packet—thus, by looking up the final destination of the packet (e.g., as identified by a header of the packet), the next destination can be retrieved from the routing table. The forwarding device may then forward the packet on an outbound interface to the identified next destination.

The forwarding device may also perform a transformation on a bit stream, insert bits, remove bits, change bits, replicate data packets or create a local state related to a bit stream which may be used to determine how to forward, modify or replicate a future data packet.

Certain aspects of the forwarding plane can affect the efficiency of the network. These aspects include the specific rules, algorithms, data structures, and functions employed, the manner in which the forwarding plane is implemented, and the location at which the forwarding plane is implemented and/or enforced.

SUMMARY

A routing controller in a communication network may be responsible for generating a device model for a target device using a universal language of network primitives. The target device may have forwarding capabilities. Exemplary embodiments allow the target device to determine how to forward the incoming data packets based on the intended behavior of the network. The target device may translate the desired behavior described using the universal language into an implementation based on the capabilities of the target device.

The universal language is a target-independent description that is used to define the intent of the network, i.e. the intended forwarding behavior. The universal language may describe a requested capability (e.g., "find the longest prefix match of a subnet mask in a routing table") without specifying how to implement the requested capability (e.g., without specifying a particular algorithm for performing a longest prefix match). The universal language may support multiple implementations of the specified functionality (e.g., a first algorithm for finding a longest prefix match, and a second algorithm for finding a longest prefix match).

According to exemplary embodiments, the device model may be parameterized. The parameterization of the device model may associate one or more parameters with one or more elements of the device model. For example, the parameters may set the values of the arguments of the one or more elements. Accordingly, the parameters may convey additional information about the requirements of the device model. The parameters may include a flag (e.g., whether virtual local area network (VLAN) encapsulation is required) or a value (e.g., min/max delays). The flags may set a desired action and the values may set the desired denomination for an element or an argument of the element.

Using parameterization, the device model does not need to be re-generated for each use. The device model can be sent to the target device along with parameters that describe the current intent of the network. A new model is not required for each modification: the modifications are captured using parameters.

In some embodiments, a non-transitory electronic device readable storage medium is provided. The storage medium holds instructions that, when executed, cause one or more processors to provide a device model in a target-independent format for a target device. The device model describes an intended forwarding behavior for the target device. The storage medium further holds instructions that, when executed, cause one or more processors to associate a first set of parameters with one or more elements of the device model to generate a first parameterized device model. The first set of parameters include one or more parameters. The first set of parameters identifies a first forwarding configuration associated with the device model. The storage medium further holds instructions that, when executed, cause one or more processors to send the first parameterized device model to a target device for configuring the target device to perform the intended forwarding behavior described in the device model, wherein the target device has a forwarding capability. The storage medium may also hold instructions that, when executed, cause one or more processors to associate a second set of parameters with the one or more elements of the device model to generate a second parameterized device model. The second set of parameters include one or more parameters. The second set of parameters identifies a second forwarding configuration associated with the device model. The second forwarding configuration is different than the first forwarding configuration. The storage medium may also hold instructions that, when executed, cause one or more processors to send the second parameterized device model to the target device for implementation.

According to various embodiments, a non-transitory electronic device readable storage medium is provided. The storage medium holds instructions that, when executed, cause one or more processors to receive a first parameterized device model described in a target-independent format. The first set of parameters include one or more parameters. The first set of parameters identifies a first forwarding configuration associated with the device model. The storage medium further holds instructions that, when executed, cause one or more processors to determine one or more elements of the first parameterized device model that can be implemented based on capabilities of a target device. The storage medium also holds instructions that, when executed, cause one or more processors to configure the target device according to the first forwarding configuration described by the determined one or more elements of the first parameterized device model, wherein the target device has a forwarding capability. The storage medium may also hold instructions that, when executed, cause one or more processors to receive one or more input packets and forward the one or more input packets to one or more elements of the network based on the first forwarding configuration.

In some embodiments, a system is provided. The system comprises a routing controller and a target device. The routing controller is configured to generate at least a first parameterized device model described in a target-independent format or a second parameterized device model described in the target-independent format. The target device is configured to receive at least the first parameterized device model or the second parameterized device model. The target device has a forwarding or switching capability. The first device model describes a first forwarding configuration for the target device. The second device model describes a second forwarding configuration for the target device. The target device is further configured to determine one or more elements of at least the first parameterized device model or the second parameterized device model that can be implemented based on capabilities of the target device. The target device is also configured to configure the target device according to at least the first forwarding configuration or the second forwarding configuration.

DETAILED DESCRIPTION

Figure 1:
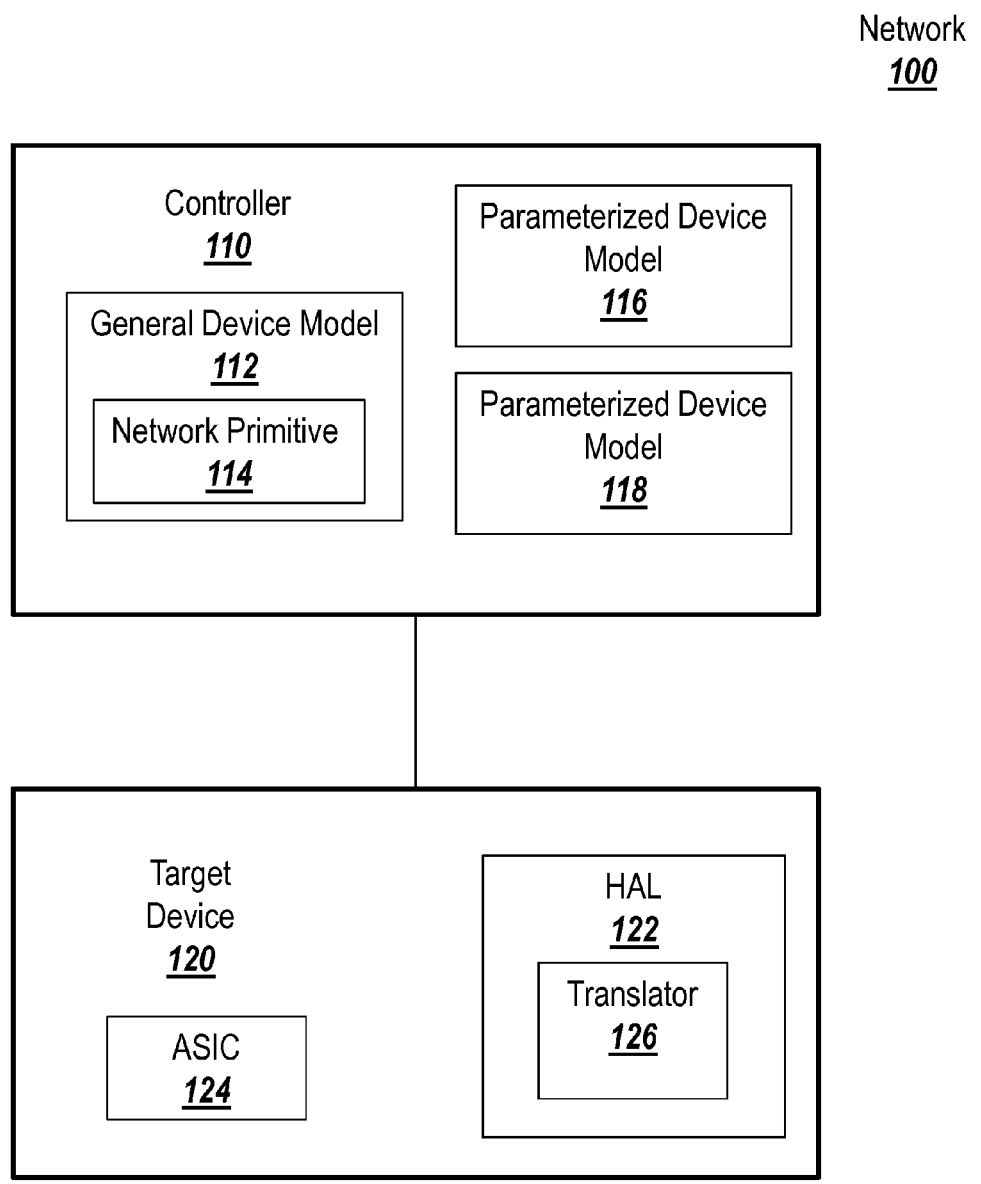
FIG. 1 depicts an exemplary network 100 including a routing controller and a target device according to an exemplary embodiment.

As described in more detail below, exemplary embodiments allow abstracting of the forwarding plane of a software defined network. Conventionally, the abstraction of setting forwarding table entries loses too much information about the intents of the application developer. Thus, conventional techniques cannot leverage all the features of the forwarding device to deliver scalable and efficient end-to-end implementations. The present application aims at mapping high-level forwarding intents to low-level features of the forwarding device. This is achieved using parameterized device models. The controller can generate an initial generic device model and capture modifications to the network behavior by assigning parameters to the generic device model. Thus, the controller can re-use the initial device model and is not required to generate a new device model for every modification to the network behavior. A plurality of different parameterized models can be generated from the initial device model. Thus, the same model may be applied to hardware of differing capabilities, with different flags or values assigned to the parameters as appropriate for each device. Since the device model is abstract, the same model may be applied to different devices if the model is appropriately parameterized within the capabilities of the target device. According to various embodiments, the same model with the same parameterization may be applied to different target devices if appropriately parameterized within the capabilities of the target device. In some embodiments, the same model with the same parameterization may be applied to disparate target devices.

A routing controller in the network may be responsible for generating a device model using a universal language of network primitives. The device model may define the intent of the network, i.e. the intended forwarding behavior. The device model may include one or more identifiers associated with one or more portions of the model.

According to various embodiments, the device model may be parameterized. The controller may assign a first set of parameters to the device model to generate a first parameterized device model. The controller may assign a second set of parameters to the device model to generate a second parameterized device model. Thus, the controller does not have to generate a different device model for each modification to the network behavior. The controller may use parameters to tailor the generated device model according to the modifications. Accordingly, the first parameterized device model may represent a different network behavior than the second parameterized device model.

The controller may send the first parameterized device model and/or the second parameterized device model to a target device. The controller may send the parameterized device models one by one or all together to the target device. The target device translates the desired behavior described in the received parameterized device model into an implementation based on the capabilities of the target device. For example, the target device may include predetermined hardware or software logic for implementing the desired behavior defined in the parameterized device model. Accordingly, the target device may implement a requested capability defined in the parameterized device model. The target device, upon receiving the parameterized device model from the controller, may statically or dynamically translate the parameterized device model.

FIG. 1 depicts an exemplary network 100 including a routing controller 110 and a target device 120 according to an exemplary embodiment. The controller 110 may include a processor, a server or any device implemented in hardware, software or a combination thereof. The network 100 may be a communications network such as the Internet, an intranet, or a telephone network, among other possibilities. The network 100 may include one or more optical, electronic, or other transmission mediums.

The controller 110 of the network 100 may be in communication with the target device 120. The controller 110 may be connected to the target device 120 directly or indirectly. It is understood that the network 100 is for explanatory purposes only, and a network suitable for use with the exemplary embodiments described herein may have other elements or capabilities. For example, the controller may generate a plurality of device models according to various embodiments.

According to an exemplary embodiment, the target device 120 may have forwarding functionality such that the target device 120 is capable of receiving incoming information on an inbound interface, processing the information to determine a next destination of the information, and forwarding the information to the next destination on an outbound interface. The target device 120 may also perform a transformation on a bit stream, insert bits, remove bits, change bits, replicate data packets or create a local state related to a bit stream which may be used to determine how to forward, modify or replicate a future data packet.

The controller 110 may generate a device model 112 using a universal language. The device model 112 may define the intent of the network 100 (e.g., the intended forwarding behavior within the network 100) using the universal language. For example, the device model 112 may describe a desired behavior of a node of the network 100 under certain conditions, such as upon the receipt of an incoming packet.

As used herein, the universal language is a target-independent language that can be interpreted by all recipient devices. The universal language may be formed of building blocks called "network primitives". The device model 112 may include one or more network primitives 114. A network primitive 114 is a basic unit of functionality to be implemented by elements of the network 100. A network primitive 114 may be, for example, a description of a particular functionality to be used in the network 100. A network primitive 114 may describe what actions elements of the network 100 are meant to perform, but typically will not include requirements for how those actions are to be carried out. Thus, a networking primitive 114 may describe a desired outcome without providing implementation details for achieving the outcome. The implementation details may be left to the particular device implementing the network primitive 114, or may be specified by an external device. The device model 112 may be constructed as a collection of one or more network primitives 114.

According to various embodiments, a network primitive 114 related to queuing may specify that a recipient device of the device model 112 is to implement flat queuing, hierarchical queuing, buffer resource sharing, dynamic buffer sizing, tail drop queue management, weighted tail drop queue management, or queue high and low watermarks. Scheduling primitives may specify that scheduling should be in a round robin fashion, as a weighted round robin, low latency queuing or strict priority queuing, weighted fair queuing, or class-based weighted fair queuing. Metering primitives may make use of one rate two color (1R2C) IP packet marking, 1R3C marking, or 2R3C marking. Numerous other networking primitives may also be utilized. The details of the implementations of these networking primitives may be unspecified and left up to the device that implements the primitives.

The device model 112 generated by the controller 110 may specify all the routing/forwarding functionality within the network 100. Using parameters, the controller 110 may specify two separate functionalities within the network 100. The controller may assign a first set of parameters to the device model 112 to generate a first parameterized device model 116. The first parameterized device model 116 may define a first routing/forwarding functionality within the network 100. In a similar fashion, the controller may assign a second set of parameters to the device model 112 to generate a second parameterized device model 118. The second parameterized device model 118 may define a second routing/forwarding functionality within the network 100. For example, the first parameterized device model 116 may request the recipient device to implement flat queuing while the second parameterized device model 118 may request the recipient device to implement hierarchical queuing.

The controller 110 may send the first parameterized model 116 to the target device 120. The first parameterized model 116 may represent a first complete set of functionality required of the target device 120. Where applicable, the target device 120 may interpret the information contained in the first parameterized model 116 within constraints known to the target device 120. Upon receiving the first parameterized model 116, the target device 120 may translate the intended behavior described in the first parameterized model 116 into an implementation. The target device 120 may include a translator 126 provided at a hardware abstraction layer (HAL) 122 of the target device 120. The translator 126 may translate the target-independent first parameterized model 116 into an implementation on the target device 120 based on the capabilities of, for example, the application specific integrated circuit (ASIC) 124 of the target device 120. Accordingly, high-level generic desired forwarding behaviors may be mapped to low-level ASIC features.

The translation of the first parameterized model 116 may be dynamic or static. In the case of the static translation, the target device 120 may have previously received and translated the first parameterized model 116. The target device 120 may retrieve a mapping that translates the first parameterized model 116 into an implementation on the target device 120. Using the retrieved mapping, the target device 120 statically translates the first parameterized model 116 into an implementation. In the case of the dynamic translation, the translator 126 of the target device 120 translates the first parameterized model 116 into an implementation without using pre-generated mappings.

The controller 110 may send the second parameterized model 118 to the target device 120. In some embodiments, the controller 110 may wait for an inquiry from the target device 120 before sending the second parameterized model 118. In other embodiments, the controller 110 may send the second parameterized model 118 without waiting for an inquiry from the target device 120. The second parameterized model 118 may be sent to the target device 120 upon generation.

According to various embodiments, the controller 110 may send the second parameterized model 118 to a different target device. That is, the controller 110 may control multiple target devices or multiple target device types by sending parameterized models to the multiple target devices. For example, the controller 110 may send a first parameterized model to a first target device and a second parameterized model to a second target device, different from the first target device.

In some embodiments, the target device 120 may determine that the target device 120 cannot implement at least a portion of the functionality defined in the first parameterized model 116. For example, the parameters of first parameterized model 116 may have values that are outside the range supported by the target device. The target device 120 may notify the controller 110 that the first parameterized model 116 cannot be implemented as requested. In response, the controller 110 may send the second parameterized device model 118 to the target device 120. The second parameterized device model 118 may be more suitable to the capabilities of the target device 120. Accordingly, the target device 120 may proceed with translating the second parameterized model 118.

The parameters of a parameterized model 116 or 118 may include one or more of a flag and value. A flag may indicate a particular state or condition in the network 100. For example, the flag may indicate that virtual local area network (VLAN) encapsulation is requested or turned on. Other exemplary flags may enable inner header time-to-live (ttl) check, enable inner header checksum validation, enable unicast reverse path forwarding (uRPF) checks, enable multiprotocol label switching (mpls) label switch router (LSR) behavior. According to various embodiments, the flags can be used to indicate whether an entire branch of a flow chart that describes data-path behavior is to be traversed or not. A value may indicate a specific quantity such as the minimum or maximum allowed delay in forwarding the incoming packets. Other exemplary values may indicate number of layers of supported encapsulation (e.g. Q-in-Q, mpls, generic routing encapsulation (GRE), etc.), minimum size of a particular lookup table, number of priority queues requires, minimum or maximum depth of queues, etc.

In some embodiments, the parameters may be labeled as mandatory or optional. The mandatory parameters are those that must be implemented by the target device 120. If the target device 120 cannot implement one or more of the mandatory parameters of a parameterized model, for example if a value indicated by the parameters are outside the bounds supported by the target device 120, the target device 120 determines that the parameterized model in cannot be implemented in its entirety. The target device 120 may notify the controller 110 and request a new parameterized model. If the target device cannot implement one or more of the optional parameters, the target device 120 may translate the portion of the parameterized model without the optional parameters into an implementation. If the target device 120 translates the portion of the parameterized model without the optional parameters into an implementation, the target device 120 may notify the controller 110 that the optional parameters are not translated into implementation.

Figure 2A:
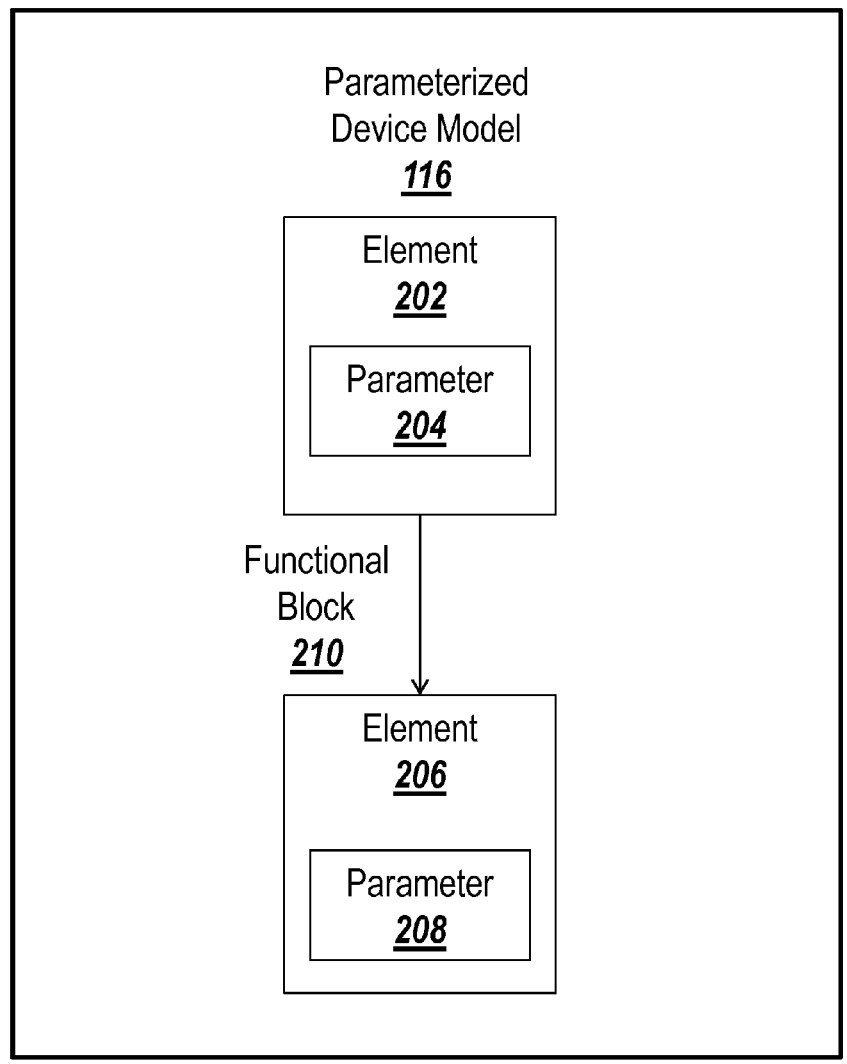
FIGS. 2A-2B depict exemplary parameterized device models according to various embodiments.
Figure 2B:
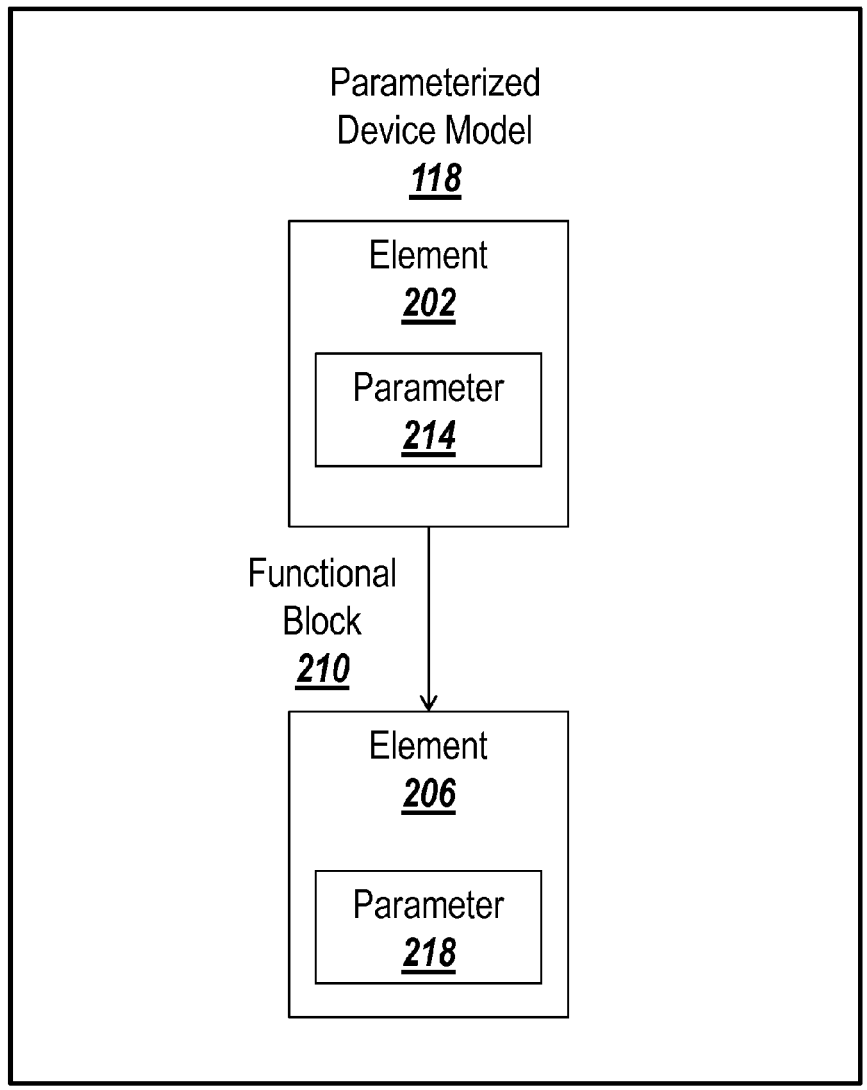

FIG. 2A illustrates the first parameterized model 116. FIG. 2B illustrates the second parameterized model 118. The first parameterized model 116 and the second parameterized model 118 have the same modeling elements, i.e. the element 202, the element 206 and the functional block 210. The element 202 and the element 206 may include one or more network primitives. The element 202 and the element 206 may be connected to each other using the functional block 210. A functional block may tie one or more network primitives into a meaning execution context. As illustrated in FIG. 2A, the elements 202, 206 of the first parameterized device model 116 may be assigned parameters 204, 208, respectively. The parameters 204, 208 may assign values and/or flags to elements 202, 206 in order to represent a first intended forwarding behavior for the network.

Similarly, as illustrated in FIG. 2B, the elements 202, 206 of the second parameterized device model 118 may be assigned parameters 214, 218, respectively. The parameters 214, 218 may assign values and/or flags to elements 202, 206 in order to represent a second intended forwarding behavior for the network. According to various embodiments, the parameter 204 may be identical to the parameter 214 or the parameter 208 may be identical to the parameter 218. It is understood that various combinations can be formed as long as the first parameterized model 116 has at least one parameterized element that is different that the parameterized elements of the second parameterized model 118. One of ordinary skill in the art will appreciate that the parameterized models illustrated herein are for illustrative purposes only and that the parameterized models may include more or less elements that those illustrated.

Figure 3:
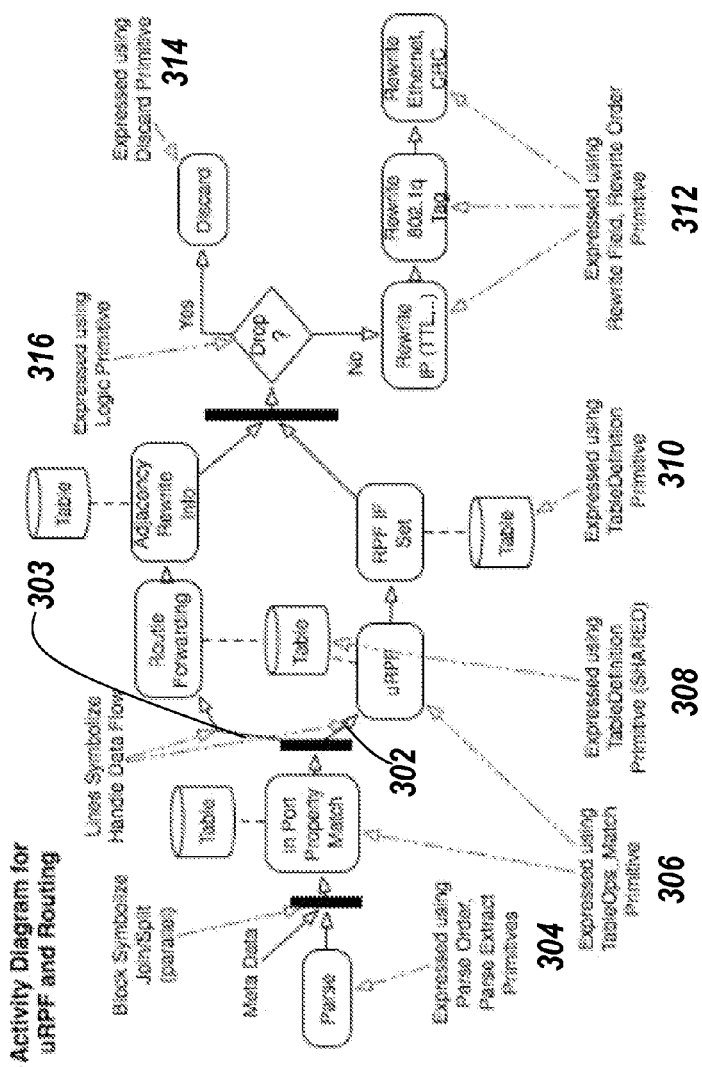
FIG. 3 depicts an exemplary device model according to an exemplary embodiment.

FIG. 3 illustrates another exemplary device model 300. The device model 300 is provided as a unified modeling language (UML) activity diagram. It is understood that UML activity diagram is used for illustrative purposed and that the device model 300 may be provided using other graphical and/or textual modeling languages. The device model 300 may represent a network behavior for implementing the unicast reverse path forwarding (uRPF) and routing. For example, the device model 300 may request a router to check the source address of an incoming packet with the routing table of the router. If the source of the incoming packet can be reached using the same interface the packet was received on, the packet may be allowed. This behavior may be implemented using of a plurality of networking primitives 304-316.

The device model 300 includes two flow branches, the first flow branch 302 and the second flow branch 303. Using the parameterization techniques, one of the flow branches 302 or 303 may be disabled. For example, the network primitives 306, 308 connected to the first flow branch 302 may be assigned such parameters that would disable the functionality implemented by either the first branch 302 or the second branch 303.

According to various embodiments, the device model 300 may also be expressed using textual code, such as a pseudo code. A portion of an exemplary pseudo code representing the device model 300 is provided below. One of ordinary skill in the art will appreciate that the pseudo code is provided for exemplary purposes and should not be construed as limiting. The following portion of the exemplary pseudo code sets up a portion of the processing pipeline. The code segment defines data stores which are often represented in specialized hardware memories but could be represented in general purpose memories with software or firmware. The code segment further describes how the data stores may be searched, an example of a subtraction operation applied to a time-to-live (TTL), a description of the fields that the pipeline needs to be able to modify, and an instruction to apply a decremented TTL over the existing TTL.

```
{
...
/* inPort Typing Information */
primitive TABLEDEF(Name="In Port Properties"/* Data Structure Name */,
    TableShared=FALSE, TableType=ARRAY,
    SearchKey={{(INDEX, 8),(INDEX, 12)}},/* 2D Array, indexed with PortID 8 bits,Vlan 12 bits*/
    TableResult={inPortPropertiesResult},/* Result struct generated by Matches on this Table */,
    TableSize=inPortTabSz /* Desired If Table showsparameterization */);
... /* Adjacency table is an Array similar to the above */
/*Routing Table Typing Information */
primitive TABLEDEF(Name="RoutingTable"/* Data Structure Name */,
    TableShared=TRUE, TableType=LPM,
    SearchKey={{(IPAddressPrefix, 32)}}, /* Table search key is 32 bit wide IPAddress */
    TableResult={uRPFResult, DBRResult}/*2 result structs gen'ed by Matches on this Table */,
    TableSize=RtSize);
...
/* RPF Interface Table Typing Information */
primitive TABLEDEF(Name="uRPFIfSetTab", FALSE, ARRAY_SET, {(Index, 8)}, {RPFSetMatch}, 128);
...
primitive                         TABLEOPS_MATCH
(MatchName=routingMatch, TABLE="RoutingTable",
    consumes(IPDestAddress),    SearchKeyMap={(IPAddressPrefix: IPDestAddress)},
```

```
    produces(AdjacencyIndex),    ResultMap={(DBRResult.
       NextHopInfo:AdjacencyIndex)});
...
primitive TABLEOPS_MATCH(MatchName=uRPFMatch,
TABLE="RoutingTable",
    consumes(IPSrcAddress),       SearchKeyMap={(IPAd-
       dressPrefix: IPSrcAddress)},
    produces(RPFSetIndex),    ResultMap={(uRPFResult.I-
       fListID: RPFSetIndex)});
...
primitive ARITHMETIC(TTLDecrementOperation, con-
sumes(IPTTL), Operation=Substract, Operand1=
    IPTTL, Operand2=1, produces(DecrementedTTL))
...
/* The correct rewrite sequence has been selected by logic and
TableOps Match. */
primitive     REWRITE_FIELD_SEQUENCE(RewriteOr-
der=1, Rewrite_IP_TTL, Rewrite_IP_Checksum,
    Rewrite_802.1Q_Vlan, Rewrite_802.1Q_Cos, Rewrite_
       8021Q_Cfi, Rewrite_Ethernet_Type, Rewrite_Ether-
       net_MAC_SA,         Rewrite_Ethernet_MAC_DA,
       Rewrite_Ethernet_CRC)
...
/* Rewrite_IPTTL_Field describes the actual field modifica-
tion */
primitive REWRITE_MODIFY(IPHdr_TTLRewrite, con-
sumes(IPHeaderStart, DecrementedTTL),
    produce                      s(TTLRewriteComplete),
       RewriteField=Rewrite_IPTTL_Field);
...
}
```

The target device, upon receiving the device model 300 in the graphical format or in the pseudo code format, translates the device model 300 into an implementation. The translation of the exemplary device model 300 in the implementation of a MAC bridge will allow communications between one or more end stations coupled to the target device in the network. Specifically, the intended behavior represented in the device model 300 allows the interconnection of one or more end stations as if they were attached to a single local area network (LAN), even if the one or more end stations are attached to separate LANs.

When the controller generates a device model, the controller may send the device model to the target device for implementation. The controller may send the device model in the graphical format and/or in a textual format such as a pseudo code. Both the graphical format and the pseudo code include one or more network primitives generated in a target-independent universal language. The steps performed by the controller and the target device are discussed below.

Figure 4:
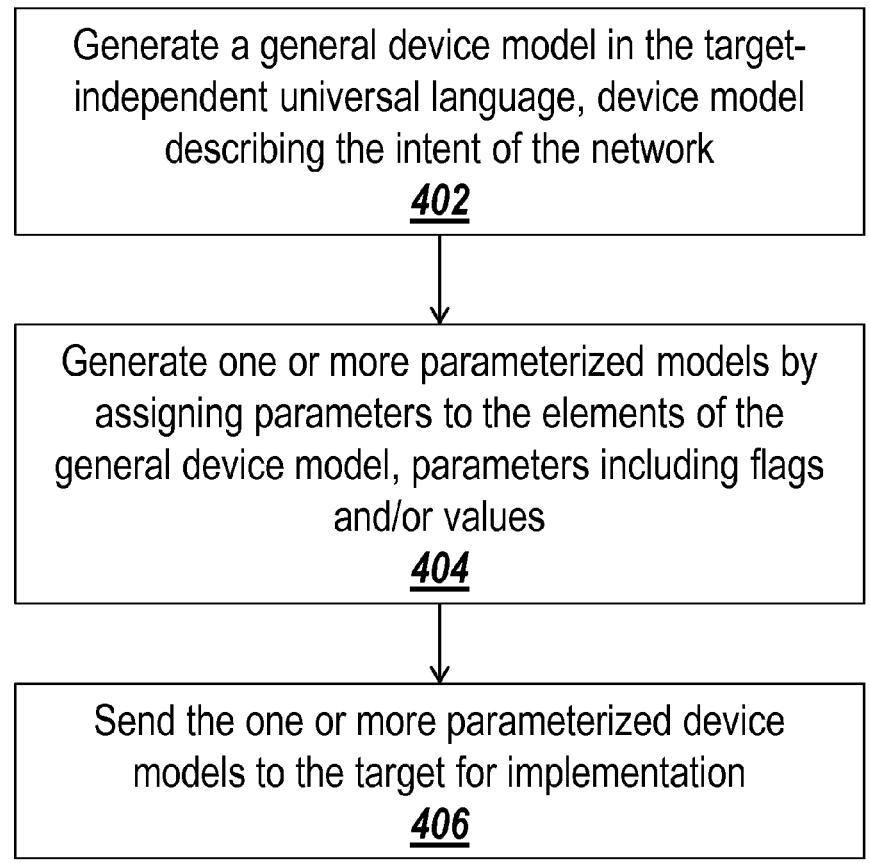
FIG. 4 is a flowchart describing exemplary steps performed by a controller in accordance with an exemplary embodiment.

FIG. 4 is a flowchart describing exemplary steps performed by a controller in accordance with an exemplary embodiment. The controller may generate a general device model in a target-independent universal language (step 402). The general device model may describe the intent of the network. The device model may be formed of a plurality of network primitives interconnected using one or more functional blocks. The controller may also generate one or more parameterized models by assigning parameters to the elements of the general device model (step 404). The parameters may include one or more of a flags and a value. The controller may send the one or more parameterized device models to the target for implementation (step 406).

Figure 5:
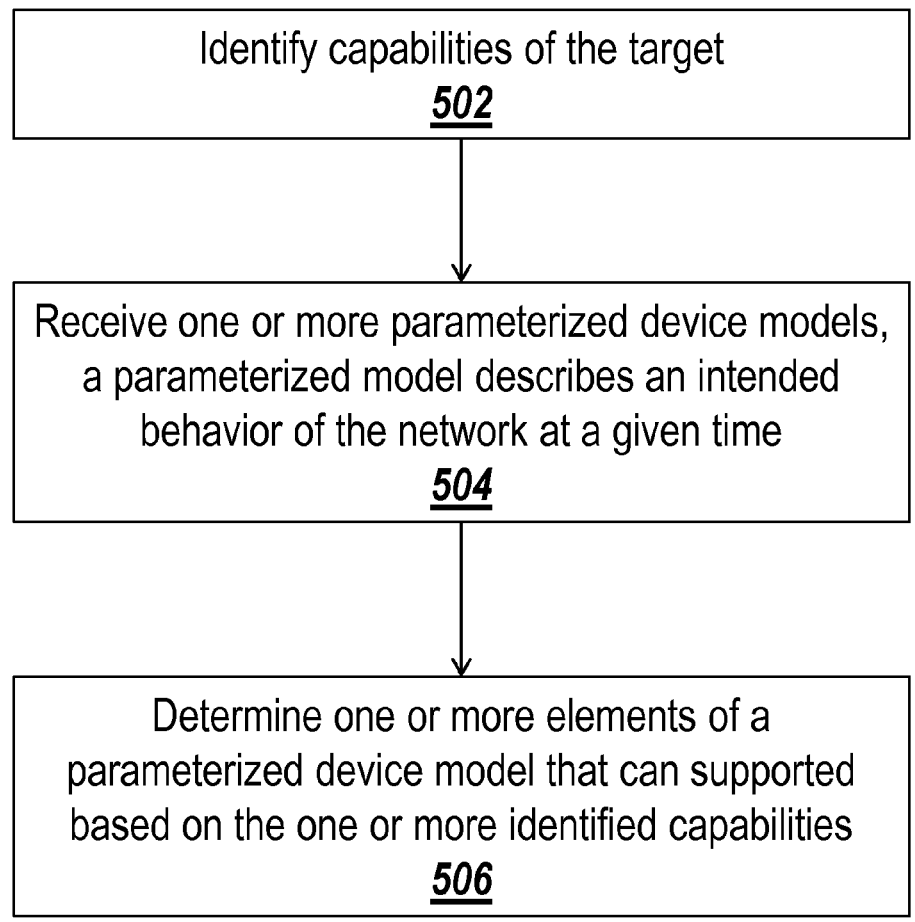
FIG. 5 is a flowchart describing exemplary steps performed by a target device in accordance with an exemplary embodiment.

FIG. 5 is a flowchart describing exemplary steps performed by a target device in accordance with an exemplary embodiment. The target device identifies the capabilities that the target device has (step 502). A variety of ASICs may be used in connection with a target device. According to various embodiments, a first ASIC may be removed and a second ASIC may be coupled to the target device. Based on the type of the ASIC(s) coupled to the target device, the capabilities of the target device may differ. The target device may receive one or more parameterized device models from the controller (step 504). A parameterized model describes an intended behavior of the network at a given time. The target device may determine one or more elements of a parameterized device model that can supported based on the one or more identified capabilities (step 506).

Figure 6:
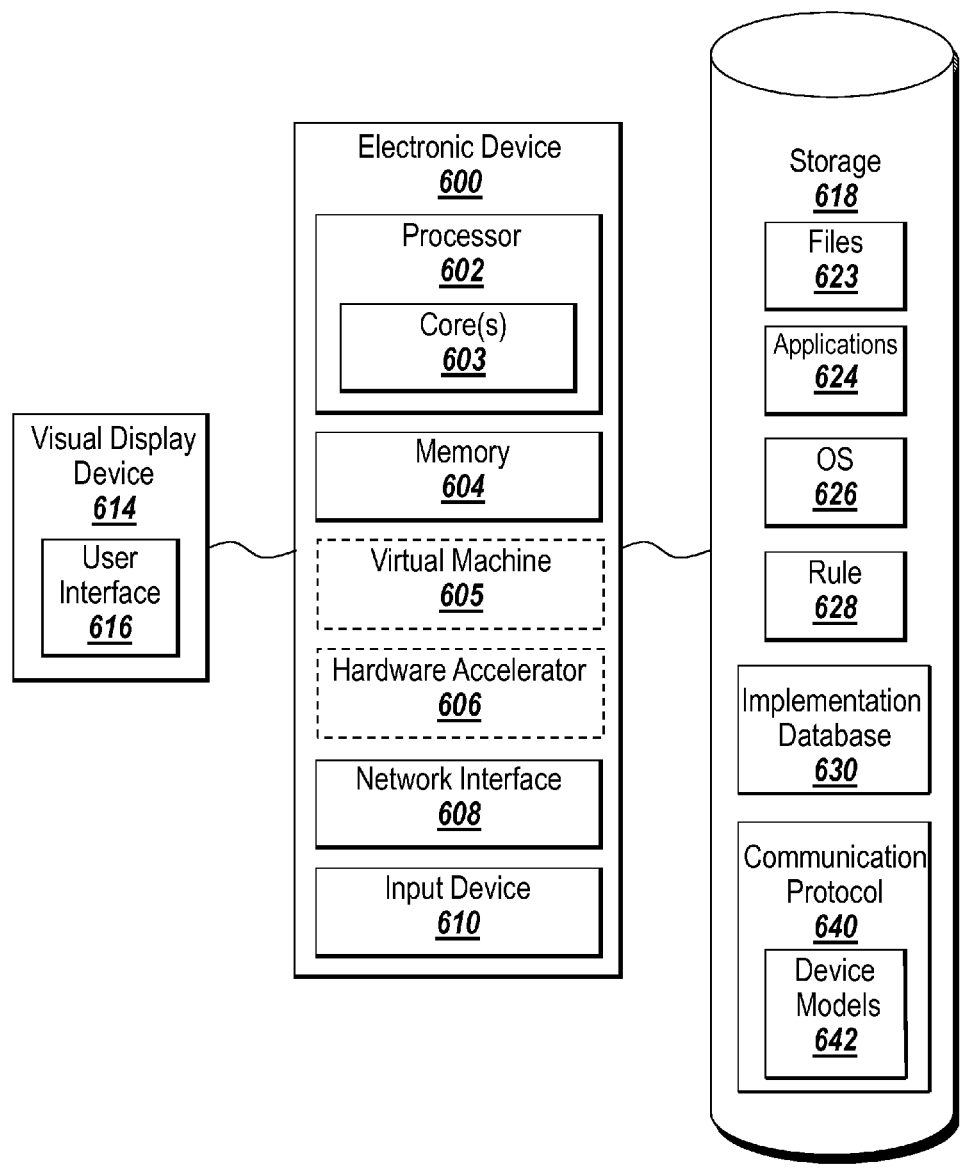
FIG. 6 depicts an exemplary electronic device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further include rules 628 which describe how messages should be forwarded in a communications network. The rules 628 may be used to forward messages or information received at the electronic device 628. Accordingly, the electronic device 600 may serve as a forwarding device, switch, or router.

The storage device 618 may store an implementation database 630. The implementation database 630 may be a data structure, such as a table or matrix, which stores identifiers identifying predetermined functions that are implemented by the electronic device 630. The implementation database may further store the implementation details of the predetermined functions.

The storage device 618 may further include logic for implementing a communications protocol 640. The communications protocol 640 may be a protocol which provides an interface for accessing and modifying the functionality of the forwarding plane of the electronic device 600. Exemplary communications protocols 640 include, but are not limited to, the OpenFlow protocol (see, e.g., McKeown, Nick et al., "OpenFlow: Enabling Innovation in Campus Networks," ACM SIGCOMM Computer Communication Review Archive, vol. 38 issue 2, pp. 69-74 (April 2008), the contents of which are incorporated herein by reference) or custom communications protocols. Thus, the electronic device 600 may serve as a remote controller, such as the controller 110 described above with respect to FIG. 1.

The communications protocol 640 may allow the details of the forwarding plane implemented by the electronic device 600 to be defined and/or modified. Accordingly, the communications protocol 640 allows a communications network to be made programmable.

The communications protocol 640 may support the use of one or more device models 642 to implement the functionality of the forwarding plane. A device model 642 may represent the complete set of network routing functionality to be implemented by the electronic device 640. For example, the device model 642 may define the functionality and performance of the forwarding plane.

The device model 642 may include one or more network primitives. A network primitive is a basic unit of functionality to be implemented by the electronic device 600. A network primitive may be, for example, a description of a particular functionality to be used in the communications network. A network primitive may describe what actions the electronic device 600 is meant to perform, but typically will not include requirements for how those actions are to be carried out. Thus, a network primitive may describe a desired outcome without providing implementation details for achieving the outcome. The implementation details may be left to the particular device implementing the network primitive, or may be specified by an external device.

For example, a network primitive related to queuing may specify that the electronic device 600 (acting as a forwarding device) is to implement a queuing strategy such as, for example, flat queuing, hierarchical queuing, buffer resource sharing, dynamic buffer sizing, tail drop queue management, weighted tail drop queue management, etc. Scheduling primitives may specify that scheduling should be in a round robin fashion, as a weighted round robin, low latency queuing or strict priority queuing, weighted fair queuing, or class-based weighted fair queuing. Metering primitives may make use of one rate two color (1R2C) IP packet marking, 1R3C marking, or 2R3C marking. Numerous other network primitives may also be utilized. The details of the implementations of these network primitives may be unspecified and left up to the device that implements the primitives.

A device model 642 may be constructed as a collection of one or more network primitives. For example, one device model 642 might specify that the electronic device 600 is to use flat queuing with round robin scheduling.

One or more device models 642 may specify all the network routing/forwarding functionality of the electronic device 600. For example, a first device model 642 may be used under certain circumstances, such as periods of high or low network traffic or upon the receipt of certain types of packets, and that a second device model 642 may be used under other circumstances. By modifying the device model 642, a network administrator may cause the electronic device 600 to exhibit different network forwarding behaviors.

The communications protocol 640 may reference a device model 642 and implement the functionality defined by the device model 642 using the functionality defined by the implementation database 630. Alternatively, the communications protocol 640 may use default or generic implementations stored locally with the communications protocol 640 or provided from a remote location, such as a remote controller.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 7:
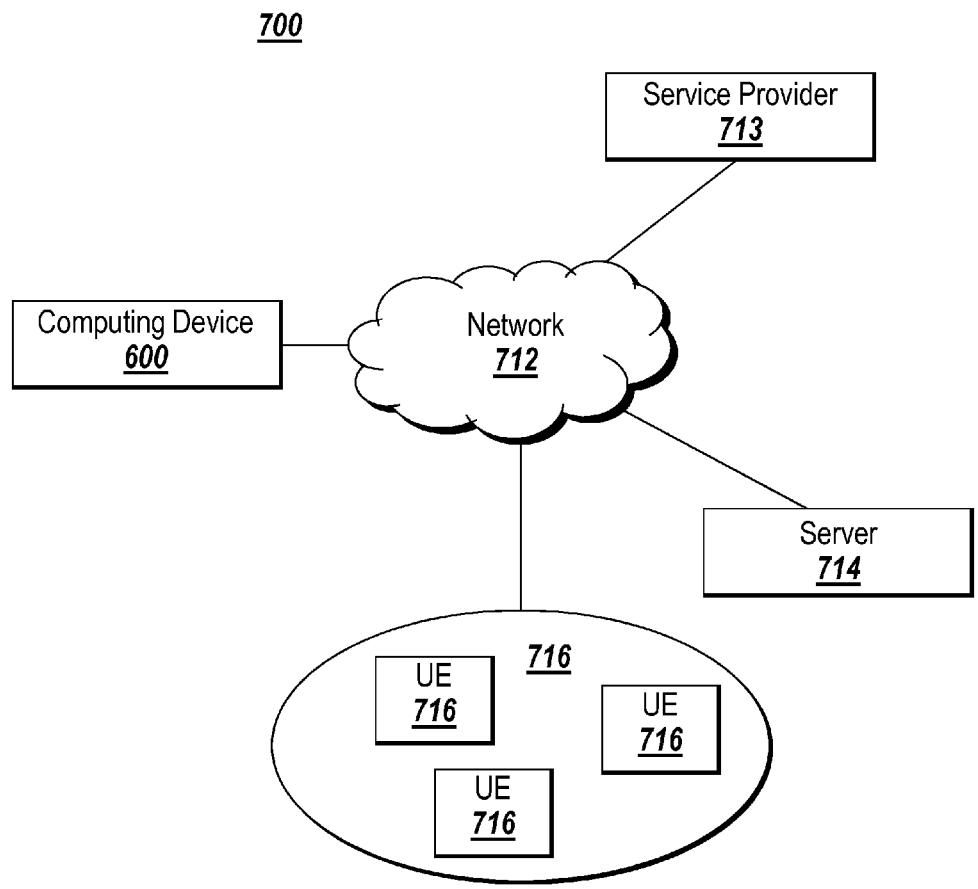
FIG. 7 depicts an exemplary network implementation of processing performed according to an exemplary embodiment.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 500 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 500 on a subscription basis (e.g., via a web service).

Units of Execution (UEs) may provide remote/distributed processing capabilities for the applications 724. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic device readable storage medium holding instructions that, when executed, cause one or more processors to:
    generate, for a target device, a device model in a target-independent format, the device model describing an intended forwarding behavior for the target device, wherein the device model includes a plurality of model branches;
    associate a first set of parameters with one or more elements of the device model to generate a first parameterized device model, wherein:
        the first set of parameters include one or more parameters,
        the first set of parameters disable at least one model branch, and
        the first set of parameters identifies a first forwarding configuration associated with the device model; and
    send the first parameterized device model to a target device for configuring the target device to perform the intended forwarding behavior described in the device model, wherein the target device has a forwarding capability.

2. The medium of claim 1, wherein the one or more parameters include at least one mandatory parameter that must be implemented by the target device.

3. The medium of claim 1, wherein the one or more parameters include at least one optional parameter that may be refused for implementation by the target device.

4. The medium of claim 1, wherein the one or more parameters include one or more flags.

5. The medium of claim 1, wherein the one or more parameters include one or more values.

6. The medium of claim 1, further holding instructions that, when executed, cause one or more processors to:
    associate a second set of parameters with the one or more elements of the device model to generate a second parameterized device model, wherein:
        the second set of parameters include one or more parameters, and
        the second set of parameters identifies a second forwarding configuration associated with the device model;
    the second forwarding configuration is different than the first forwarding configuration; and
    send the second parameterized device model to the target device for implementation.

7. The medium of claim 6, wherein the one or more parameters include one or more a flag or a value.

8. A non-transitory electronic device readable storage medium holding instructions that, when executed, cause one or more processors to:
- receive a first parameterized device model generated from a device model in association with a first set of parameters, the device model describing an intended forwarding behavior for a target device in a target-independent format, wherein:
    - the first set of parameters include one or more parameters,
    - the first parameterized device model includes a plurality of model branches at least one of which is disabled using one or more parameters, and
    - the first set of parameters identifies a first forwarding configuration associated with the device model;
- determine one or more elements of the first parameterized device model that can be implemented based on capabilities of the target device; and
- configure the target device according to the first forwarding configuration described by the determined one or more elements of the first parameterized device model, wherein the target device has a forwarding capability.

9. The medium of claim 8, further holding instructions that, when executed, cause one or more processors to:
- receive one or more input packets;
- forward the one or more input packets to one or more elements of the network based on the first forwarding configuration.

10. The medium of claim 8, wherein the first parameterized device model includes at least one mandatory parameter that must be implemented by the target device.

11. The medium of claim 8, wherein the first parameterized device model includes at least one optional parameter that may be refused for implementation by the target device.

12. The medium of claim 8, wherein the first parameterized device model includes one or more flags.

13. The medium of claim 8, wherein the first parameterized device model includes one or more values.

14. The medium of claim 8, further holding instructions that, when executed, cause one or more processors to:
- receive a second parameterized device model generated from the device model in association with a second set of parameters, wherein:
    - the second set of parameters include one or more parameters, and
    - the second set of parameters identifies a second forwarding configuration associated with the device mode;
- determine one or more elements of the second parameterized device model that implemented based on the capabilities of the target device;
- receive one or more input packets; and
- forward the one or more input packets to one or more elements of the network based on the second forwarding configuration.

15. A system comprising:
- a routing controller configured to generate at least a first parameterized device model described in a target-independent format or a second parameterized device model described in the target independent format;
- a target device configured to:
- receive at least the first parameterized device model or the second parameterized device model, wherein:
    - the target device has a forwarding or switching capability,
    - the first parameterized device model includes a plurality of model branches at least one of which is disabled using one or more parameters,
    - the second parameterized device model includes a plurality of model branches at least one of which is disabled using one or more parameters,
    - the first parameterized device model describes a first forwarding configuration for the target device, and
    - the second parameterized device model describes a second forwarding configuration for the target device;
- determining one or more elements of at least the first parameterized device model or the second parameterized device model that can be implemented based on capabilities of the target device; and
- configuring the target device according to at least the first forwarding configuration or the second forwarding configuration.

16. The system of claim 15, wherein the first parameterized device model is generated by associating a first set of parameters with one or more elements of a device model, wherein:
- the first set of parameters include one or more parameters, and
- the first set of parameters identifies a first forwarding configuration associated with the device model.

17. The system of claim 15, wherein the second parameterized device model is generated by associating a second set of parameters with one or more elements of a device model, wherein:
- the second set of parameters include one or more parameters, and
- the second set of parameters identifies a second forwarding configuration associated with the device model.

18. The system of claim 17 wherein the target device is configured to:
- receive one or more input packets, and
- forward the one or more input packets to one or more elements of the network based on at least the first forwarding configuration or the second forwarding configuration.

* * * * *